US005793958A

United States Patent [19]
Clement et al.

[11] Patent Number: 5,793,958
[45] Date of Patent: Aug. 11, 1998

[54] NETWORK INTERFACING SYSTEM WITH MODULES FOR ADMINISTRATING VARIOUS PROTOCOL LAYERS FOR A PLURALITY OF OSI MODELS

[75] Inventors: Valerie Clement, Meylan; Regis Mouret, Le Fontanil; Nathalie Saint Paul, Chaville, all of France

[73] Assignee: Bull S.A., Louveciennes, France

[21] Appl. No.: 624,416

[22] PCT Filed: Nov. 4, 1994

[86] PCT No.: PCT/FR94/01275

§ 371 Date: Jun. 10, 1996

§ 102(e) Date: Jun. 10, 1996

[87] PCT Pub. No.: WO95/13676

PCT Pub. Date: May 18, 1995

[30] Foreign Application Priority Data

Nov. 8, 1993 [FR] France ................ 93 13282

[51] Int. Cl.[6] .................. G06F 15/177
[52] U.S. Cl. .............. 395/200.5; 395/200.53; 395/200.6; 395/200.8; 395/500
[58] Field of Search ............ 395/200.1, 200.12, 395/200.14, 200.2, 830, 831, 200.5, 200.53, 200.6, 200.8, 500

[56] References Cited

U.S. PATENT DOCUMENTS 5,473,608  12/1995  Gagne et al. ............ 370/401
5,491,822  2/1996   Allen et al. ............. 395/683
5,613,100  3/1997   Anezaki ................. 395/500

FOREIGN PATENT DOCUMENTS 0463764  1/1992  European Pat. Off. .

OTHER PUBLICATIONS

IEEE Network: The Magazine of Computer Communications, vol. 2, No. 2, Mar. 1988, NY, US, pp. 20–29; S.M. Klerer "The OSI Management Architecture: An Overview".

Primary Examiner—Kenneth S. Kim
Attorney, Agent, or Firm—Kerkam, Stowell, Kondracki & Clarke, P.C.; Edward J. Kondracki

[57] ABSTRACT

A system (SCI1) for communicating with a network (RE, etc.) which implements a communication code (CC) belonging to a plurality of interconnection models (OSI, IPS), including a package (C4, C3, C2) for administering the communication code (CC) which includes communication modules belong to various models, and wherein the package includes a configuration manager (CONFD) operable during the initialization of the system to establish the stacking of the various layers of the code, an administration module (IMD) which allows access to all the administrative information within each of the layers, a first administration interface (LMAI1, LMI1) disposed between the configuration manager (CONFD) on the one hand, and various administration entities and the administration module (IMD) on the other hand, and a second administration interface (LMAI2, LMI2) disposed between the administration module (IMD) and the administration entities (LME11, LME12).

7 Claims, 5 Drawing Sheets

NETWORK INTERFACING SYSTEM WITH MODULES FOR ADMINISTRATING VARIOUS PROTOCOL LAYERS FOR A PLURALITY OF OSI MODELS

This application is a national stage application of PCT/FR94/01275 filed Nov. 4, 1994, claiming the priority of French Application No. 93.13282, filed Nov. 8, 1993.

BACKGROUND OF THE INVENTION

The present invention relates to a system for communicating with a network which implements a communication code belonging to a plurality of open systems interconnection models, which system includes a package for administrating the various layers of the code. It is applicable to all types of networks, particularly the FDDI type standardized through the ANSI under the reference number X3T9-5 and through the ISO (International Organization for Standardization).

Modern networks operate according to a plurality of reference models which are similar when it comes to the definition of their architecture being in the form of standardized layers. Among these models, the best known are the OSI (English acronym for Open Systems Interconnection), ISO/DSA, and IPS (English acronym for Internet Protocol Suite) models (it will be recalled that the IPS model includes, under the same name, the submodels TCP, UDP, IP, and ICMP in particular). Thus, in the OSI model, there are seven different layers of activities, with the lowest layer (layer 1) corresponding to the physical transmission of the signals and the highest layer (layer 7) corresponding to the functions carried out by the application programs (more simply called applications) and the users of the network in question.

In current practice, systems for communicating with a network are constituted by the association of a computer, called a host system, and a communications processor. The purpose of the communications processor is to carry out part of the management of communications with the other terminals in the network. In this capacity, the communication processor takes care of the management of the lower layers of each of the reference models.

A communications system of this type is described, for example, in French patent application No. 93 02902, filed on Mar. 12, 1993 by the assignee of the instant application under the title "System for communicating with a network" or in French patent application No. 93 08968, filed by the assignee of the instant application on Jul. 21, 1993 under the title "System for communicating with a network and protocol for access to the transport provider belonging to this system." These two patent applications describe the software structure of a communications system of this type in greater detail and are hereby incorporated by reference herein. Moreover, a description of the hardware structure of such a system can be found in French patent application No. 92 15521, the title of which is "System for transmitting data between a computer bus and a network" filed on Dec. 22, 1992 by the instant assignee, and incorporated hereby by reference.

Figure 1A:
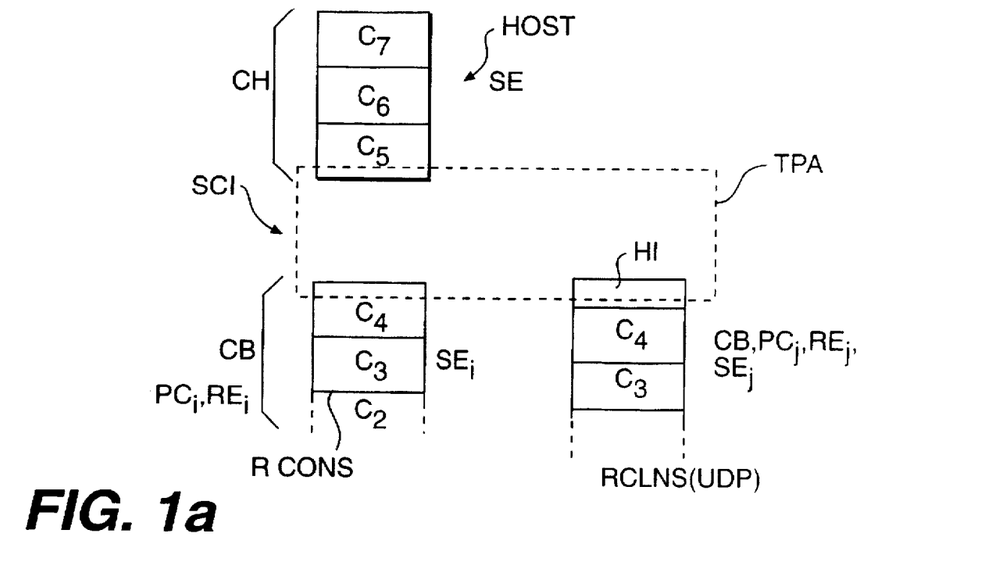
FIGS. 1a and 1b, show the various essential elements constituting a communications system to which the invention applies.
Figure 1B:
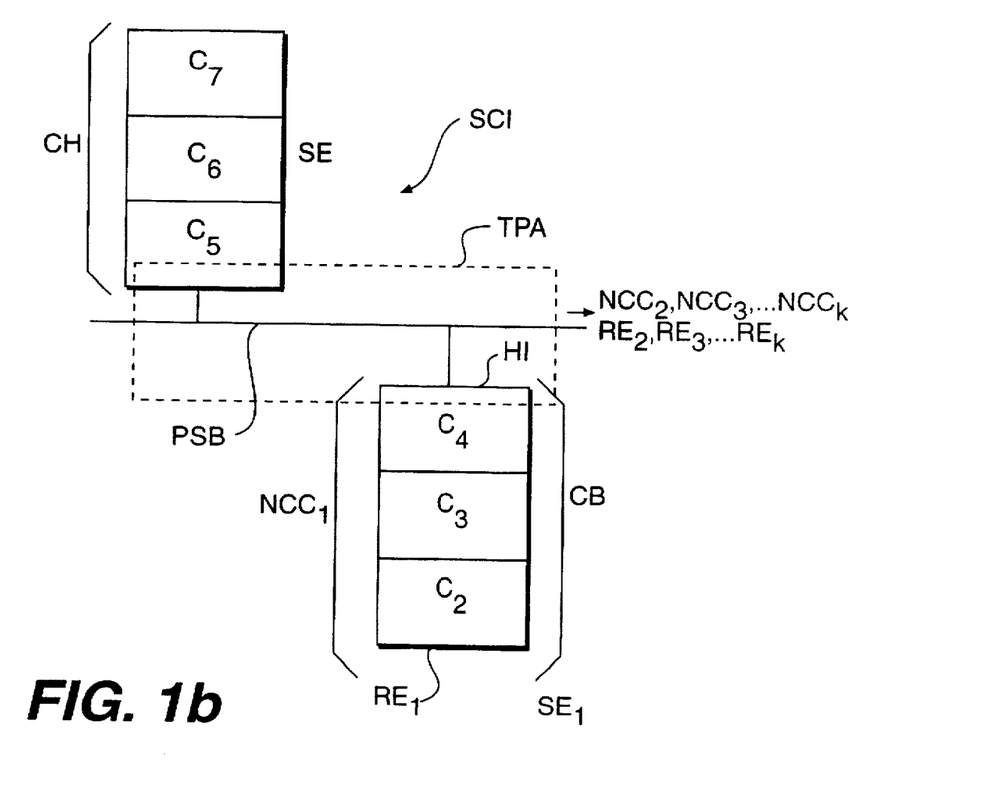

The general structure of a communications system of this type, which includes at least one communications processor (such a communications system can contain several communications processors which can communicate with several networks of different types), is shown in extremely simplified form in FIGS. 1a and 1b.

A communications system of this type, here called SCI, implements, using the host system HOST, the upper layers CH of any one of the reference models OSI, ISO/DSA, IPS (the latter of which can be supported just as well by a connection-mode network service as by a connectionless-mode network service; the connection mode, which is designated by the sign CONS, the English acronym for Connection Oriented Network Service, and the connectionless mode, which is designated by the sign CNLS, the English acronym for Connectionless Network Service, are based on the ISO standards 98787 and 8208 for the first and 8473 and 9542 for the second, which standards define the associated routing mechanisms and protocols).

Figure 2:
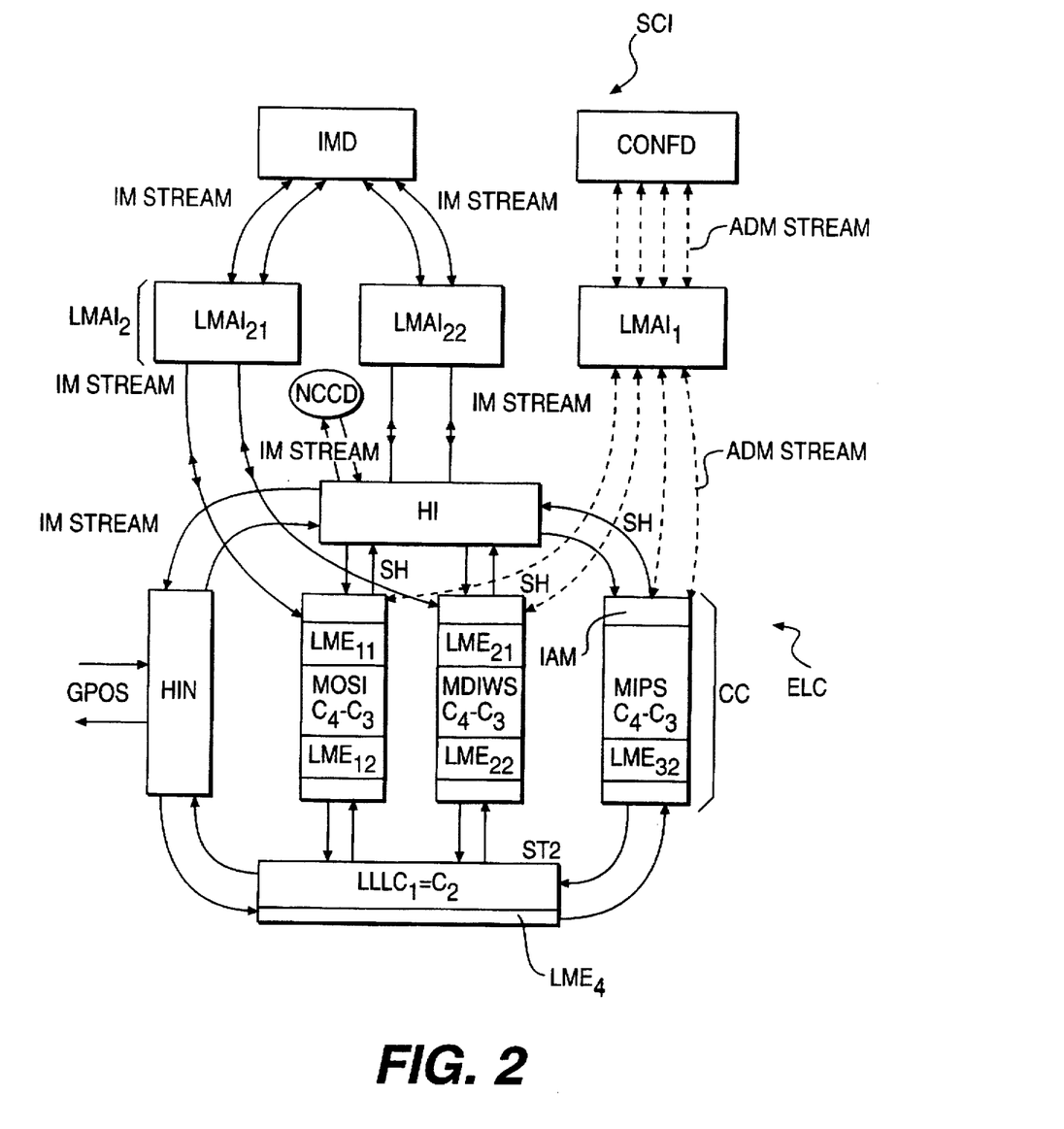
FIG. 2 shows the package of software modules included in the communications processor, which package includes the administration package suited to the system according to the invention, FIG. 3, in a more general way, shows the structure of any communications system according to the invention.

Refer to FIGS. 1a and 1b, in which the three upper layers C5 through C7 of the OSI model are shown by way of example. The layers CH communicate with the lower layers CB, namely C4 through C2 of these same models. These layers can be implemented by one or more communications processors. In FIG. 2, it is assumed that SCI is constituted by the host HOST associated with the communications processors PCi, PCj, which can be different types, their common point being their implementation of the lower layers CB. The processor PCi is linked to a network REi, while PCj is linked to a network REj, which these two networks can be different types. In addition, PCi as well as PCj can implement transport layers which are supported either by a connection-mode network service RCONS (ISO/DSA or TCP model) or by a connectionless-mode network service (UDP model).

In FIG. 1a, the layers CH of HOST communicate with the lower layers CB, implemented by a plurality of message processors, while in FIG. 1b this transfer is, for example, carried out by means of a bus of the MULTIBUS II type, here called PSB (IEEE standard 1296).

In every communications system, and more specifically in every communications processor, the user needs to know, at every instant, the status of each of the layers of the communication code, and even of each of the objects situated inside the communication layers.

It will be recalled that an object belonging to a layer of a communication code is constituted by a set of functionalities which operate for the same purpose: thus, for example, the set of functionalities which serves to define a connection is an object. Physically, an object is constituted by a data table located in memory, or a set of data tables.

An attribute, or even a parameter, defines a characteristic of an object. An object could therefore be defined by a set of attributes. A set of attributes, each of which attributes has a value, is also called an object instance. The status of an object of a layer of a communication code depends on the instant at which it is considered. It can be in a state of communication with other layers, or even in a configuration or initialization state. In order to know, at each instant, the status of the objects or each of the communication layers, every communications system generally includes an administration package which allows it to know the status of each of the layers or each of the objects in a layer.

It is precisely the object of the present invention to define such an administration package for all communications systems like those shown in FIGS. 1a and 1b.

SUMMARY OF THE INVENTION

According to the invention, the system for communicating with a network, which implements a communication code belonging to a plurality of open systems interconnection models, the operation of which is organized by at least one operating system associated with a plurality of applications, the purpose of which is to transmit to or to receive from the network the data necessary to the applications, which includes a package for administering the various layers of the code, is characterized in that this package includes:

- a configuration manager which, during the initialization of the system, establishes the stacking of the various layers by means of links of the STREAMS type between them,
- an administration module which allows access to any administrative information within each of the layers of the code,
- a first administration interface between the administration module and the administration entities of the layers located inside them,
- a second administration interface between the configuration manager on the one hand, and the various entities and the administration module on the other hand.

BRIEF DESCRIPTION OF THE DRAWINGS

Other characteristics and advantages of the present invention will be apparent from the following description, given as a non-limiting example and in reference to the appended drawings.

In these drawings.

DETAILED DESCRIPTION OF THE PREFERRED EMBODIMENTS

FIG. 2 this figure shows the communication software package ELC which belongs, for example, to one of the communications processors NCC1, NCC2, NCC3 already described in any of the three above-mentioned patent applications. This software package ELC is part of the communications system according to the invention, a system which will be designated the same as in FIG. 1, namely SCI.

The package ELC comprises:

- a communication code CC, which for example includes three stacks of communication layers suitable for various reference modules, namely the OSI model, the ISO/DSA model, and the IPS model. These various modules are called, respectively, MOSI, MDIWS, MIPS. They are more specifically related to the layers C4 and C3. The communication code also comprises the layer C2, called LLC1, which is common to the three modules MOSI, MDIWS, MIPS.
- the interface HI between the communications server NCCD belonging to the host system HOST, and the lower layers CB, represented here by the three modules MOSI, MDIWS, MIPS. The role of HI and NCCD is described in more detail in the abovementioned patent applications 93 02902 and 93 08968.

the interface HIN already described in one of the three above-mentioned patent applications makes it possible to make the interface HI and the layer C2 communicate with the operating system GPOS of the communications processor belonging to the communications system SCI according to the invention.

- the configuration module CONFD, whose role has been specified above,
- the administration module IMD, whose role has also been specified above.
- a first administration interface LMAI1 disposed between the configuration manager CONFD and each of the communication modules MOSI, MDIWS, MIPS.
- a second administration interface LMAI2 actually comprised of two identical administration interfaces, namely LMAI21 and LMAI22, which respectively ensure the interface between the administration module IMD and each of the three communication modules MOSI, MDIWS, MIPS on the one hand, and with the interface HI on the other hand.

The link between the configuration manager CONFD and the first administration interface LMAI1 on the one hand, and the links between the latter and each of the three modules MOSI, MDIWS and MIPS is achieved by means of "STREAMS"-type links, more specifically called ADM STREAMS. The links between the administration module IMD and each of the two interfaces LMAI21 and LMAI22, as well as the links between these last two interfaces and the three communication modules MOSI, MDIWS and MIPS on the one hand and the interface HI on the other hand are achieved by means of "STREAMS"-type links, more specifically IM STREAMS, which are administrative-type links.

Moreover, it will be recalled that the communication layers C2, C3, C4 communicate with one another two by two by means of primitive functions which allow two adjacent layers to communicate with one another. Thus, the layers C2 and C3 communicate with one another by means of the set of STREAM-type functions ST2, while the layers C3 and C4 communicate by means of the set of functions ST3. Moreover, C4 communicates with the interface HI by means of a set of functions SH. These sets of functions are also functions of the STREAM type. All of the functions ST2, ST3, SH, ADM STREAM, and IM STREAMS, are defined in the following documents:

Unix System V, Release 4—STREAM Programmer Guide, ATT, Issue 1,

Unix System V, Release 3.2—STREAM Programmer Guide, ATT (ISBN: 0-13-944810-1); 1989.

Moreover, in the OSI and ISO/DSA models, each of the communication layers includes specific administration entities, entities whose role is to organize the job of administrating each of the communication layers belonging to the communication code CC. Thus, the module MOSI includes the administration entities LME11 and LME12, which relate to the layers C4 and C3 respectively, and the module MDIWS includes the administration entities LME21 and LME22 which relate to the layers C4 and C3. The MIPS module includes a single administrative interface IAM which relates to C4 and C3 (see below). The layer C2 common to OSI and IPS has the administration entity LME4.

Figure 3:
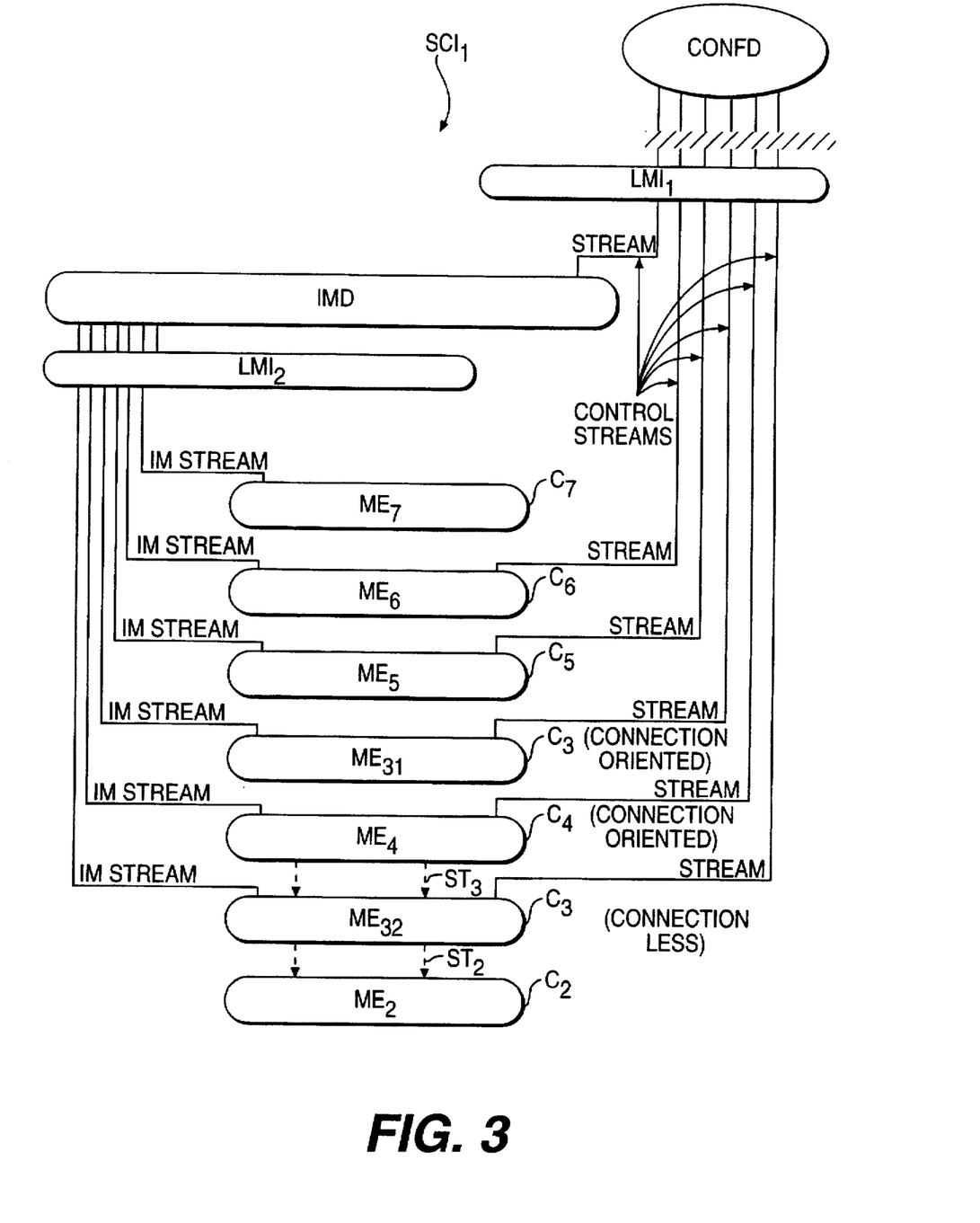

FIG. 3 shows the more general structure of a communications system according to the invention SCI1, in which the two entities constituted by the host system HOST and the communications processor NCC1 are joined into one. It may be observed that in this same figure there is a configuration module CONFD whose role is strictly analogous to that in FIG. 2, an administration module IMD whose role is strictly identical to that in FIG. 2, a first administration interface LMI1 whose role is identical to the administration interface LMAI1 in FIG. 2, and a second administration interface LMI2 whose role is strictly identical to that of the administration interface LMAI2 in FIG. 2.

Thus, the first administration interface LMI1 ensures the link between the configuration module CONFD and each of the administration entities in the layers C6 through C2 by means of a control STREAM of the ADM STREAM type. The first interface also ensures the link with the administration module IMD by means of an ADM STREAM-type STREAM.

The second administration interface LMI2 ensures the link between the administration module IMD and each of the administration entities of the layers C7 (presentation layer) through C2 by means of a link of the IM STREAM type. The administration entities of the layers C7 through C2 are respectively designated ME7 through ME2. FIG. 3 shows the administration entities ME31 and ME32 which are the administration entities of the layers C3, which respectively relate to a network operating in the Connection Oriented mode and in the Connectionless mode. The link between ME4 as well as ME31 and ME32 is ensured by known STREAM-type links.

It is understood that the operation of the communications systems SCI in FIG. 2 and SCI1 in FIG. 3 is identical.

In FIG. 2, as well as in FIG. 3, each layer administration entity, LME11 through LME21, LME4 and IAM, as well as the various entities ME7 through ME2, manage a set of objects, each of which is described by a plurality of attributes. These sets of objects conform to the various standards which define each of the reference modules, whether the OSI model, the ISO/DSA model, or even the IPS model. It is also possible, in the communications processor or in the communications system SCI1, to implement standard management protocols such as the protocols SNMP, CNMA, or even OSI/NMFORUM.

The module IMD works in connection with either the operating system of the communications processor or that of the communications system SCI1 in its entirety, and it is responsible for routing messages to or from the entities and the maintenance, configuration and administration tools which are also inside these layers. As may be ascertained above, all the exchanges between the administration entities and the module IMD are based on communications by means of STREAM functions.

The first and second administration interfaces, namely LMAI1 and LMAI2 in FIG. 2, or LMI1 and LMI2 in FIG. 3, define the dialogues between the module IMD, the configuration manager CONFD, and the various administration entities of the layers located inside the communication codes.

Figure 4:
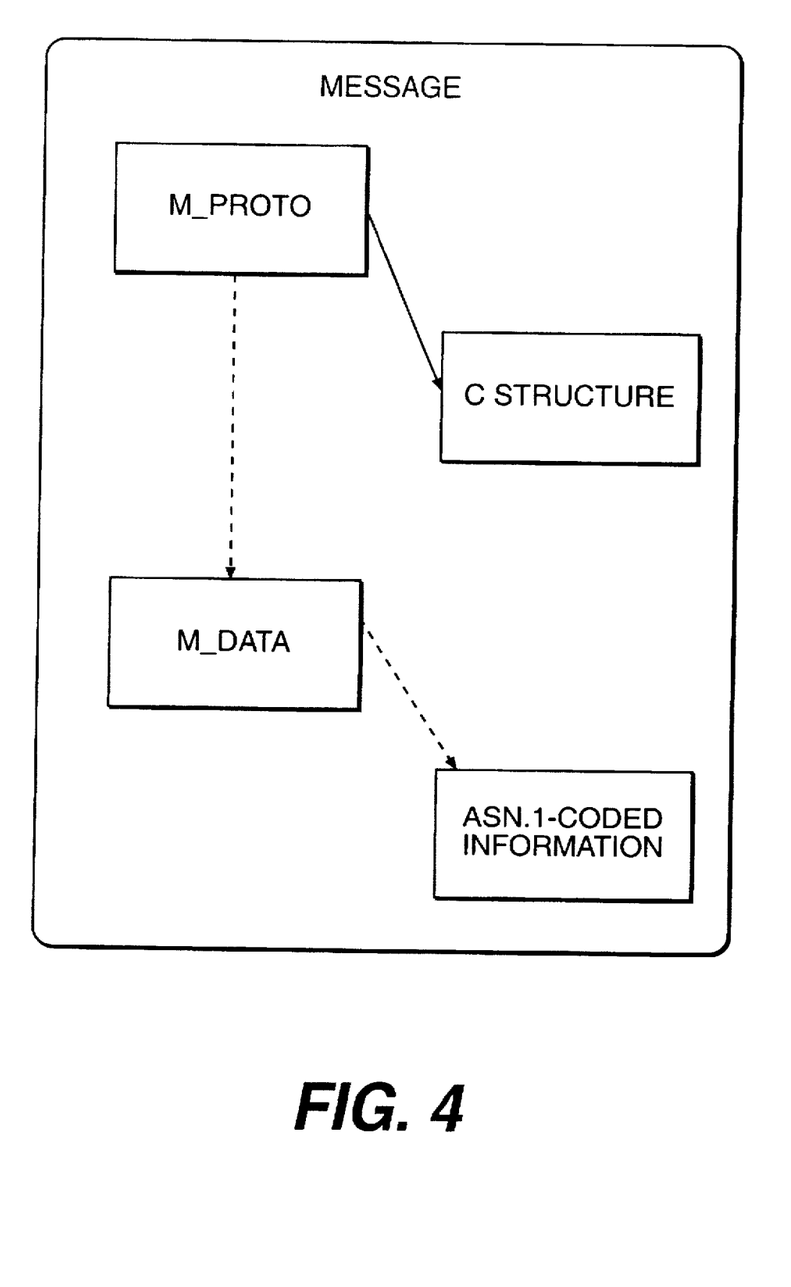
FIG. 4 shows the structure of a message suited to the administration package belonging to the communications system according to the invention.

Referring now to FIG. 4, which shows the general form of a message in conformity with the STREAM standard used to transport the primitive administration functions, each of which primitives defines the direction of a message.

A message comprises a first block, designated M-PROTO, which may or may not be followed by a block called M-DATA. Each primitive function is formed by a specific data structure called a C structure, which may or may not be followed by a data set (buffer) which contains the administrative information exchanged. Each C structure defines the global exchange of information between the entities and the module IMD. This C structure is contained within the block M-PROTO. The information associated with the primitive which defines its direction is transported in the block M-DATA. M-PROTO and M-DATA are encoded in a format of the ASN.1 type in order to respond to the needs of the module IMD. The types of information coded ASN.1 are the following:

- a status list, called Status-list: this list provides the states of the various entities or objects which it is desirable to administrate.
- a list called Param-list, which comprises the list of the various entities or objects which it is desirable to administrate.
- a list called ident-list which comprises the list of the identifiers of the objects for which it is desirable to retrieve the values.

Figure 5:
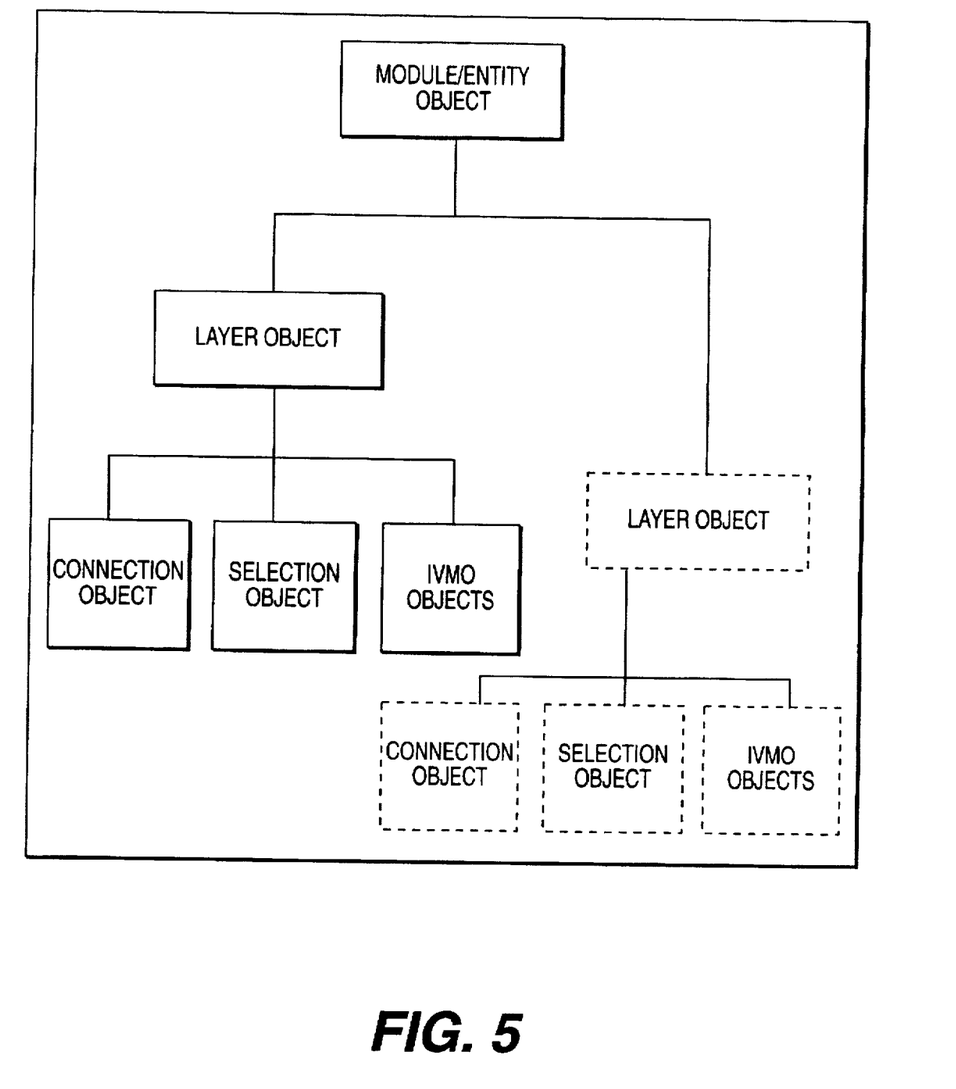
FIG. 5 shows the internal structure of each of the administration modules belonging to the administration package of the communications system according to the invention.

Referring now to FIG. 5, which shows the hierarchy of the various objects. A module object, for example, an object of a module such as MOSI, MDIWS, or MIPS contains layer objects, that is, either an object from the layer 4 or an object from the layer 3 which contains a plurality of objects which are either connection objects, selection objects, or even objects called IVMO, which is the English acronym for Initial Value Manage Object, and which consequently are the objects which define the initial values of each layer object.

A module or an administrate entity is identified by an integer called SUBSYSTEM-id. For the entities contained within the operating system, whether in the operating system of the communications processor or even more generally in the operating system of a communications system such as SCI1, the identifier of the module is given by the configuration manager CONFD at the instant of initialization. The module IMD uses this identifier to expedite the messages to the correct module or to the entity inside a layer.

An administered object is identified by three fields, which are the following:

SUBSYSTEM-id: this field defines the identifier of the module which contains this administered object.

OBJECT-type: this identifier defines the administrative type of the object.

OBJECT-name: this is either, in the OSI model, an identifier giving an internal name given by the module which contains the object, or in the IPS model, an integer (0 through n) which makes it possible to recognize the (0 through n) first parameters conveyed in the block M-DATA as being particular parameters used to search for the instance of the object requested (in the case in which the module cannot be named).

The implementation of the module assumes that the administered objects of the same type which are contained in the module have different names.

The common parameters of primitives sent by any administration interface (LMAI, LMI in FIGS. 2 and 3) are the following:

The parameters named PRIM-name and PRIM-type identify a request from the administration interface or a response.

The parameter IM-userid is provided by the module IMD and allows this module to perform a correct routing of the response to the entity which supplied the request. It is clear that this parameter has the same value whether it relates to the request or the response.

Among the parameters common to all the primitives related to the administration interfaces, there are also the parameters SUBSYSTEM-id, OBJECT-type and OBJECT-name defined above.

There is also another parameter called OBJECT-subtype, which is used to distinguish sets of objects of the same type which will not support the same administrative requests.

As for the selection, connection and IVMO-type objects, the object immediately above these represents the layer object which contains them. It is identified by the following three fields:

SUBSYSTEM-upid is the identifier of the entity, that is of the layer which contains the higher object, OBJECT-uptype is the administrative type of the higher object, OBJECT-upname is the name of the higher object.

There are two types of messages used by the modules CONFD, IMD, and LMAI1, LMAI2, LMI1, LMI2, namely the administrative messages on the one hand and the configuration messages on the other hand.

The various administrative messages will be considered first. The list of administrative messages appears in Appendix 1 and the list of configuration messages appears in Appendix 2. In each of these two appendices, the names of the messages appear in one column and the reference models, namely the OSI, IPS or FDDI type to which each message belongs, appear in subsequent columns. In addition, the name of the sender of the message and the name of the receiver of the message appear in the last two columns on the right.

The administration messages numbered from 1 to 21 (which are types 1 through 21) are the following:

1. ADM-BIND-LAYER-REQ message:

This message is a request message sent to an administration entity by the module IMD in order to initialize the dialogue between this entity and this module. It is the first message sent to the entity by the module in question. The entity responds by sending one (or more) messages called ADM-BIND-OBJ-IND indicating which type of object the entity in question administers. When the entity has sent all of the messages ADM-BIND-OBJ-IND corresponding to the set of objects it manages to IMD, it sends a message ADM-OK-ACK to IMD in order to indicate the end of its response. No other message can be sent by the module IMD to an administration entity before this final acknowledgement message has been received. The entity which receives the request message then assigns a link of the STREAM type to the administration information.

2. ADM-BIND-OBJ-IND message:

This message is sent in response to the preceding by the administration entity to which the module IMD is addressed. It is sent by means of a STREAM function of the IM-STREAMS type. The administration entity sends only one message of this nature per type of object administrated.

3. ADM-OK-ACK message:

This message terminates the initialization dialogue between the module IMD and the administration entity. It is sent through an IM-STREAMS after one or more type 2 messages in response to the type 1 message.

This message can also be used to indicate to the module IMD that a previously sent message has been successfully received by an administration entity when no other response for this has been defined.

4. ADM-ERROR-ACK message:

This message indicates to IMD that a previously sent message has not been successfully received by an administration unit and cannot be processed due to an error in the system. This message indicates the reasons for the failure. The reception of this message also indicates to IMD that no action on the message has been performed to cause this negative response.

5. ADM-LIST-REQ message:

This message is sent by the module specified in the field OBJECT-type.

For the connection, selection and IVMO objects, it supplies the name of the objects whose type is specified in the field OBJECT-type and which are associated with the layer object identified by the fields OBJECT-uptype, OBJECT-upname, SUBSYSTEM.

6. ADM-LIST-ACK message:

This message is sent by a PILE (layer stacking) entity to the module IMD in response to its type 5 message. It gives the list of the administrative names of the object instances for a given type of object.

7. ADM-GET-REQ message:

This message is sent by IMD to request an administrated entity to return the value of the attributes of an object instance. If a list of attributes is supplied, the list of the values of the attributes must be returned to the module IMD. If no list is supplied, all the values of the attributes must be returned. An error is indicated in the response supplied by the administration entity if any one attribute cannot be read.

8. ADM-GET-ACK message:

This message is sent by the administration entity to IMD in response to the preceding type 7 message. It returns the required attribute values of the object instance. An error is indicated if at least one attribute cannot be read.

9. ADM-GETNEXT-REQ message:

This message allows an administration entity to obtain the attributes of all the instances of an object without knowing the names of these instances. In this case, it is not necessary to send a type 5 message in order to obtain the name of the object instance. The list of the object names is managed by the entity in an arbitrary order, which order depends on its implementation within the layer.

10. ADM-GETNEXT-ACK message:

This message is sent by an administration entity in response to the type 9 message. It returns the requested values of the object attributes to the module IMD. An error is indicated if these attributes cannot be read.

11. ADM-SET-REQ message:

This message is sent by IMD to an administration entity through an IM STREAM. It makes it possible to give a new value to the attributes of an object instance. This operation applies to attributes which are defined as being able to be written. The list they provide, in the part M-DATA, contains the identifiers of the attributes and the associated values given to the attribute values which must be replaced.

12. ADM-SET-ACK message:

This message is sent by an administration entity in response to the preceding type 11 message. It indicates whether or not the operation for changing the value of the attributes required by the type 11 message has been successful.

13. ADM-TEST-REQ message:

This message is sent to the administration entities by IMD. It makes it possible to verify if the values of several attributes of an object instance can be modified simultaneously to obtain a new value. The attribute values are not modified by this message.

14. ADM-TEST-ACK message:

This message is an acknowledgment message sent by an administration entity in response to the preceding type 13 message.

15. ADM-ACTION-REQ message:

This message is sent by IMD to the administration entities. The functions of this message depend on the type of action mentioned in the field PRIM-type.

16. ADM-ACTION-ACK message:

This message is sent by an administration entity in response to the preceding type 15 message, and it indicates whether this last request has been successful.

17. ADM-ADD-REQ message:

This message requests an administration entity to create a new object instance. It is not admitted for all types of objects. In order to create an object, a certain number of attributes of the object are needed and must be furnished in the request. The name of the object which must be created is furnished by the module which will administrate it. This name is furnished in the response to the request constituted by this message.

18. ADM-ADD-ACK message:

This message is sent by an administration entity in response to the preceding type 17 message, and it allows acknowledgement of the success of the request.

19. ADM-REMOVE-REQ message:

This message requests an administration entity to remove an object instance.

20. ADM-REMOVE-ACK message:

This message is sent by an administration entity in response to the preceding type 19 message to acknowledge whether or not the request corresponding to this type 19 message has been successful.

21. ADM-EVENT-IND message:

This message indicates to the module IMD that an event is taking place in the layer entity. For the administration module, there is now acknowledgement when it receives the indication that an event has occurred in this layer entity.

As may be seen in Appendix 1, all of the type 1 through 21 messages are used for the OSI or ISO/DSA reference model. All of these messages are also used for the IPS model, with the exception of messages 5 and 6.

The type 4 and type 7 through 21 messages are also used for the FDDI-type network.

The identification of objects for the IPS reference model has certain particular aspects as compared to this identification for the OSI reference model.

The field OBJECT-type is a class of objects which is composed of parameters. An IPS object is defined by its OBJECT-type field and by an instance of this class. If it is a simple object (mono-instance), the identification is simply given by the field (OBJECT-type). An instance is defined by the values of the selection parameters. These parameters, which give an identification and a value, are transmitted in the block of messages M-DATA of the request.

The field OBJECT-name contains the number of parameters used for the selection. Thus, if necessary, the first instances of the block of messages M-DATA are the selection parameters.

The blocks of messages M-DATA are coded in ASN.1.

The various configuration messages, numbered from 22 to 32 (types 22 through 32), which are the following and which appear in Appendix 2, will now considered.

The presentation of Appendix 2 is strictly identical to the presentation of Appendix 1.

These various messages are the following:

22. ADM-SUBSYSTEM-ID message:

This message is sent by the configuration manager CONFD in FIG. 2 as soon as each of the modules of the communications processor has been opened, or by each of the modules in the system SCI1 in FIG. 3, either by being conveyed through an ADM STREAM or an IM STREAM. Any entity which it is desirable to administrate can retrieve this message and should know how to understand it.

23. ADM-STREAM-BIND message:

This message is sent by CONFD just after the opening of the control Stream of a module. This stream is then assigned by this module to the configuration manager CONFD.

24. ADM-STREAM-ACK message:

This message is sent by the module to the configuration manager if the request of the preceding type 23 message has been accepted.

25. ADM-STREAM-NACK message:

This message is sent by the module to the configuration manager CONFD if the request indicated by the type 23 message has been refused.

26. ADM-STREAM-OPEN message:

This message is sent to the configuration manager through an ADM STREAM by a module, in order to request a new Stream-type link to another module. This is the case, for example, with the creation of the streams link between the layer C4 and the layer C3 of the OSI model. This link is to be created dynamically as provided by the standards.

27. ADM-STREAM-CLOSE message:

This message is sent to the configuration manager CONFD by a module in order to request the disconnection of a module. This is the case, for example, in the OSI model, with a layer C4 (called a COTP layer) which is requesting the disconnection of a layer C3 (called a CLNP layer), that is, which is requesting that the streams link between them be broken.

28. ADM-STREAM-ERROR message:

This message is sent by the configuration manager CONFD to the module to which the configuration manager is addressed if an error occurs during the sending of a request delivered by the ADM-STREAM-OPEN message (type 26 message).

29. M-IOCTLI-LINK message:

This message is sent by the configuration manager in response to the module to which it is addressed, if no error has occurred during the sending of the request corresponding to the type 26 message.

30. M-IOCTLI-UNLINK message:

This message is sent by the configuration manager in response to the module to which it is addressed, if no error has arisen during the sending of the request corresponding to the ADM-STREAM-CLOSE message (type 27 message).

31. M-IOCACK message:

This message is returned by the module to the configuration manager after the sending of a request corresponding to either of the messages defined in 29 or 30.

32. M-IOCNACK message:

This message is returned by the module to the configuration manager after the sending of a request corresponding to either a type 29 or type 30 message. It corresponds to a negative acknowledgement.

It may be seen, by looking at Appendix 2, that all of the configuration messages are valid for an OSI-type stacking of layers. For an IPS-type stacking, only the message ADM-SUBSYSTEM-ID is used during the initialization of the communications processor.

The ADM-SUBSYSTEM-ID message is only sent to IAM (a specific internal module which serves as the administrative interface between the layers C3 and C4 of the IPS-type stacking and the administrative commands delivered by the administrative arm) by the configuration manager CONFD.

This internal module represents, by construction, the administrative interface for all the layers of the MIPS module.

In the configuration for the FDDI network, known standardized messages of the SMT type are used.

In some respects, Appendices 3, 4, 5, 6 summarize what has been said above in the description of each of the messages. Thus, all the configuration messages which have been defined above as a function of different circumstances are found in Appendix 3. In this appendix, the configuration manager CONFD located in the central part of the figure is symbolized by a vertical line, while the entity in question, that is for example an administration entity of one of the layers C4 or C3 of one of the modules MOSI, MIPS, MDIWS is represented by a vertical line situated on the right side of the figure. The messages are symbolized by arrows, with the direction of the arrow indicating the direction in which the message is sent. So for example, by reading the upper part of Appendix 3, it may be seen that in order for the request to create a new link to succeed, the message ADM-STREAM-OPEN sent by the entity to CONFD, the message M-IOCTLI-LINK sent by the configuration manager to the entity, and finally the message M-IOCACK sent by the entity to the configuration manager, are used in succession. It is obvious that the reading of Appendix 4 and the other appendices is identical to that just indicated for the upper part of Appendix 3.

Appendix 4 shows the exchange of messages between the module IMD and any entity, and in it it is possible to find practically all of the administration messages described above.

Appendix 5 describes the two messages which are exchanged between the module IMD and any entity when a message sent by IMD is not accepted by the layer entity because of an error which prevents the correct processing of the message.

Appendix 6 shows the exchange of messages between CONFD, IMD and a PILE entity during the initialization phase.

While the preferred embodiments of the instant invention have been illustrated and described, it will be apparent to those of ordinary skill in the art that various changes and modifications may be made without deviating from the inventive concepts and spirit of the invention, and it is intended by the appended claims to define all such concepts which come within the full scope and true spirit of the invention.

APPENDIX 1

ADM

| MESSAGES | OSI | IPS | FDDI | SENDER | RECEP-TEUR |
|---|---|---|---|---|---|
| ADM-BIND-LAYER-REQ | X | X | | IMD | LME |
| ADM-BIND-OBJ-IND | X | X | | LME | IMD |
| ADM-OK-ACK | X | X | | LME | IMD |
| ADM-ERROR-ACK | X | X | X | LME | IMD |
| ADM-LIST-REQ | X | | | IMD | LME |
| ADM-LIST-ACK | X | | | LME | IMD |
| ADM-GET-REQ | X | X | X | IMD | LME |
| ADM-GET-ACK | X | X | X | LME | IMD |
| ADM-GETNEXT-REQ | X | X | X | IMD | LME |
| ADM-GETNEXT-ACK | X | X | X | LME | IMD |
| ADM-SET-REQ | X | X | X | IMD | LME |
| ADM-SET-ACk | X | X | X | LME | IMD |
| ADM-TEST-REQ | X | X | X | IMD | LME |
| ADM-TEST-ACK | X | X | X | LME | IMD |
| ADM-ACTION-REQ | X | X | X | IMD | LME |
| ADM-ACTION-ACK | X | X | X | LME | IMD |
| ADM-ADD-REQ | X | X | X | IMD | LME |
| ADM-ADD-ACK | X | X | X | LME | IMD |
| ADM-REMOVE-REQ | X | X | X | IMD | LME |
| ADM-REMOVE-ACK | X | X | X | LME | IMD |
| ADM-EVENT-IND | X | X | X | LME | IMD |

APPENDIX 2

CONFIG

| MESSAGES | OSI | IPS | FDDI | SENDER | RECEIVER |
|---|---|---|---|---|---|
| ADM-SUBSYSTEM-ID | X | X | | CONFD | LME |
| ADM-STREAM-BIND | X | | | CONFD | LME |
| ADM-STREAM-ACK | X | | | LME | CONFD |
| ADM-STREAM-NACK | X | | | LME | CONFD |
| ADM-STREAM-OPEN | X | | | LME | CONFD |
| ADM-STREAM-CLOSE | X | | | LME | CONFD |
| ADM-STREAM-ERROR | X | | | CONFD | LME |
| M-IOCTLI-LINK | X | | | CONFD | LME |
| M-IOCTLI-UNLINK | X | | | CONFD | LME |
| M-IOCACK | X | | | LME | CONFD |
| M-IOCNACK | X | | | LME | CONFD |

APPENDIX 3

APPENDIX 4

APPENDIX 6

APPENDIX 5

We claim:

1. A system (SCI, SCI1) for communicating with a network (RE, etc.) which implements a communication code (CC) belonging to a plurality of open systems interconnection models (OSI, ISO/DSA, IPS), including at least one operating system (GPOS, SE1) associated with a plurality of applications, said system being operable to transmit, or receive from the network, data necessary to the applications and comprising a package for administering various layers (C4, C3, C2) forming the communication code (CC), which package comprises a plurality of communication modules belonging to various open systems interconnection models, wherein said package comprises:
- a configuration manager (CONFD) operable during initialization of the system to define stacking of the various layers using links therebetween,
- an administration module (IMD) which enables access to all administrative information within each of the various layers of the communication code, which various layers each include at least one administration entity (LME11, LME12, etc.), said at least one administrative entity being operable to interface several communication layers of a given communication module, the administration module communicating with said at least one administrative entity in a language common to all of said at least one administrative entities
- a first administration interface (LMAI1, LMI1) disposed between the configuration manager (CONFD), and the various administration entities, and between the configuration manager (CONFD) and the administration model (IMD),
- a second administration interface (LMAI2, LMI2) disposed between the administration module (IMD) and the administration entities of the various layers (LME11, LME12, etc.).

2. A communications system according to claim 1, wherein the administration entities (LME11, LME12, etc.) are disposed within each layer for an OSI reference model, and an entity common to all the layers is disposed in the highest layer of the IPS model, with each administration entity organizing a job of administrating each of the layers for the OSI reference model and all of the layers for an IPS model.

3. The system according to claim 2, wherein each administration entity (LME11, LME12, etc.) manages a set of objects, each of said objects being described by a plurality of attributes.

4. The system according to claim 1, wherein the administration module (IMD) works in connection with the at least one operating system (GPOS, SE1, etc.) and performs routing of administration messages (ADM-BIND-LAYER-REQ, etc.) to and from the administration entities (LME11, etc.) and maintenance and configuration tools disposed within the layers, and further wherein said first and second administration interfaces (LMAI1, LMAI2, LMI1, LMI2) establish communications between the administration module (IMD), the configuration manager (CONFD), and the various administration entities (LME11, etc.).

5. The system according to claim 4, wherein administration message comprises a first block (M-PROTO) followed by a second block (M-DATA), said first block including a data structure called a primitive, which defines an exchange of information between the administration entities and the administration module (IMD), and said second block includes information which defines a significance of the primitive.

6. The system according to claim 3, wherein each of said objects of a module comprises layer objects, each of said layer objects including either connection objects, selection objects, or IVMO objects defining initial values of each layer object.

7. The system according to claim 6, wherein each of said objects is identified by three fields, a first field (SUBSYSTEM-id) defining an identifier of the communication module containing the object in question, a second field (OBJECT-type) defining the administrative type of the object and a third field (OBJECT-name) defining an internal name given by the communication module which contains the object.

* * * * *